United States Patent
Hinze et al.

(10) Patent No.: US 7,735,920 B2
(45) Date of Patent: Jun. 15, 2010

(54) CHILD SEAT AND METHOD FOR MONITORING INSTALLATION OF THE CHILD SEAT

(75) Inventors: Lee R. Hinze, Kokomo, IN (US); Hugh R. Hunkeler, Kokomo, IN (US)

(73) Assignee: Delphi Technologies, Inc., Troy, MI (US)

(*) Notice: Subject to any disclaimer, the term of this patent is extended or adjusted under 35 U.S.C. 154(b) by 347 days.

(21) Appl. No.: 11/961,220

(22) Filed: Dec. 20, 2007

(65) Prior Publication Data

US 2009/0160232 A1 Jun. 25, 2009

(51) Int. Cl.
*B60N 2/28* (2006.01)
(52) U.S. Cl. ............... 297/250.1; 297/216.12; 297/217.3; 73/862.391; 280/801.1; 340/457.1
(58) Field of Classification Search ............ 297/216.11, 297/217.3, 250.1, 468, 483, 484; 73/862.391, 73/862.454; 180/268, 271; 280/735, 801.1; 340/457.1; 701/45; 702/98, 100
See application file for complete search history.

(56) References Cited

U.S. PATENT DOCUMENTS

| | | | |
|---|---|---|---|
| 6,259,042 B1 * | 7/2001 | David .................... 73/862.391 |
| 7,029,068 B2 * | 4/2006 | Yoshida et al. ............ 297/250.1 |
| 7,233,239 B2 * | 6/2007 | Chitalia et al. ............ 340/457.1 |
| 7,422,283 B2 * | 9/2008 | Patterson et al. .......... 297/250.1 |
| 2003/0158643 A1 * | 8/2003 | Murphy et al. ............... 280/735 |
| 2005/0092539 A1 * | 5/2005 | Chitalia et al. .......... 297/216.11 |
| 2005/0097973 A1 * | 5/2005 | Waidner et al. ......... 73/862.454 |
| 2006/0006713 A1 * | 1/2006 | Patterson et al. .......... 297/250.1 |
| 2008/0246316 A1 * | 10/2008 | Carine et al. ............ 297/216.11 |

* cited by examiner

*Primary Examiner*—Peter R. Brown
(74) *Attorney, Agent, or Firm*—Thomas N. Twomey

(57) ABSTRACT

A child seat and a method for monitoring installation of the child seat are provided. The child seat includes a child seat frame configured to receive a child occupant. The child seat frame is configured to receive a seat belt webbing for securing the child seat frame to a vehicle seat. The child seat further includes a first bladder configured to contact the seat belt webbing. The first bladder has a fluid therein. The child seat further includes a first pressure sensor fluidly communicating with the fluid in the first bladder. The first pressure sensor is configured to output a first signal indicative of an amount of pressure in the first bladder. The child seat further includes a controller coupled to the child seat frame configured to receive the first signal and to compute a first tension value based on the first signal. The controller is further configured to generate a second signal to induce a first device disposed on the child seat frame to indicate when the first tension value is less than a first predetermined tension value.

18 Claims, 5 Drawing Sheets

CHILD SEAT AND METHOD FOR MONITORING INSTALLATION OF THE CHILD SEAT

BACKGROUND

Child seats have been utilized to hold infants or children therein within vehicles. During installation of child seats in a vehicle, if a sufficient amount of tension is applied to the vehicle's seat belt webbing to secure the child seat, rotation of the child seat with respect to a vehicle seat is restricted which assists in protecting a child disposed in the child seat. However, if an insufficient amount of tension is applied to the seat belt webbing when securing the child seat, the child seat may rotate more than desired during a sudden stop.

Accordingly, the inventors herein have recognized a need for a child seat that can notify a person when a desired amount of tension is being applied to seat belt webbing when securing a child seat on a vehicle seat.

SUMMARY

A child seat in accordance with an exemplary embodiment is provided. The child seat includes a child seat frame configured to receive a child occupant. The child seat frame is configured to receive a seat belt webbing for securing the child seat frame to a vehicle seat. The child seat further includes a first bladder configured to contact the seat belt webbing. The first bladder has a fluid therein. The child seat further includes a first pressure sensor fluidly communicating with the fluid in the first bladder. The first pressure sensor is configured to output a first signal indicative of an amount of pressure in the first bladder. The child seat further includes a controller coupled to the child seat frame configured to receive the first signal and to compute a first tension value based on the first signal. The controller is further configured to generate a second signal to induce a first device disposed on the child seat frame to indicate when the first tension value is less than a first predetermined tension value.

A method for monitoring installation of a child seat on a vehicle seat in accordance with another exemplary embodiment is provided. The child seat has a child seat frame configured to receive a child occupant. The child seat frame is configured to receive a seat belt webbing for securing the child seat frame to a vehicle seat. The child seat further includes a first bladder, a first pressure sensor, and a controller. The first bladder has a fluid therein and contacts the seat belt webbing. The first pressure sensor fluidly communicates with the fluid in the first bladder. The controller is operably coupled to the first pressure sensor. The method includes generating a first signal indicative of an amount of pressure in the first bladder contacting the seat belt webbing, utilizing the first pressure sensor. The method further includes determining a first tension value based on the first signal, utilizing the controller. The method further includes generating a second signal to induce a first device disposed on the child seat frame to indicate when the first tension value is less than a first predetermined tension value, utilizing the controller.

A vehicle seat in accordance with another exemplary embodiment is provided. The vehicle seat includes a vehicle seat frame configured to receive an occupant. The vehicle seat further includes a seat belt webbing coupled to the vehicle seat frame and configured to secure the occupant to the vehicle seat frame. The vehicle seat further includes a first bladder configured to contact the seat belt webbing. The first bladder has a fluid therein. The vehicle seat further includes a first pressure sensor fluidly communicating with the fluid in the first bladder. The first pressure sensor is configured to output a first signal indicative of an amount of pressure in the first bladder. The vehicle seat further includes a controller coupled to the vehicle seat frame. The controller is configured to receive the first signal and to compute a first tension value based on the first signal. The controller is further configured to generate a second signal to induce a first device disposed on the vehicle seat frame to indicate when the first tension value is less than a first predetermined tension value.

DESCRIPTION OF EXEMPLARY EMBODIMENTS

Figure 1:
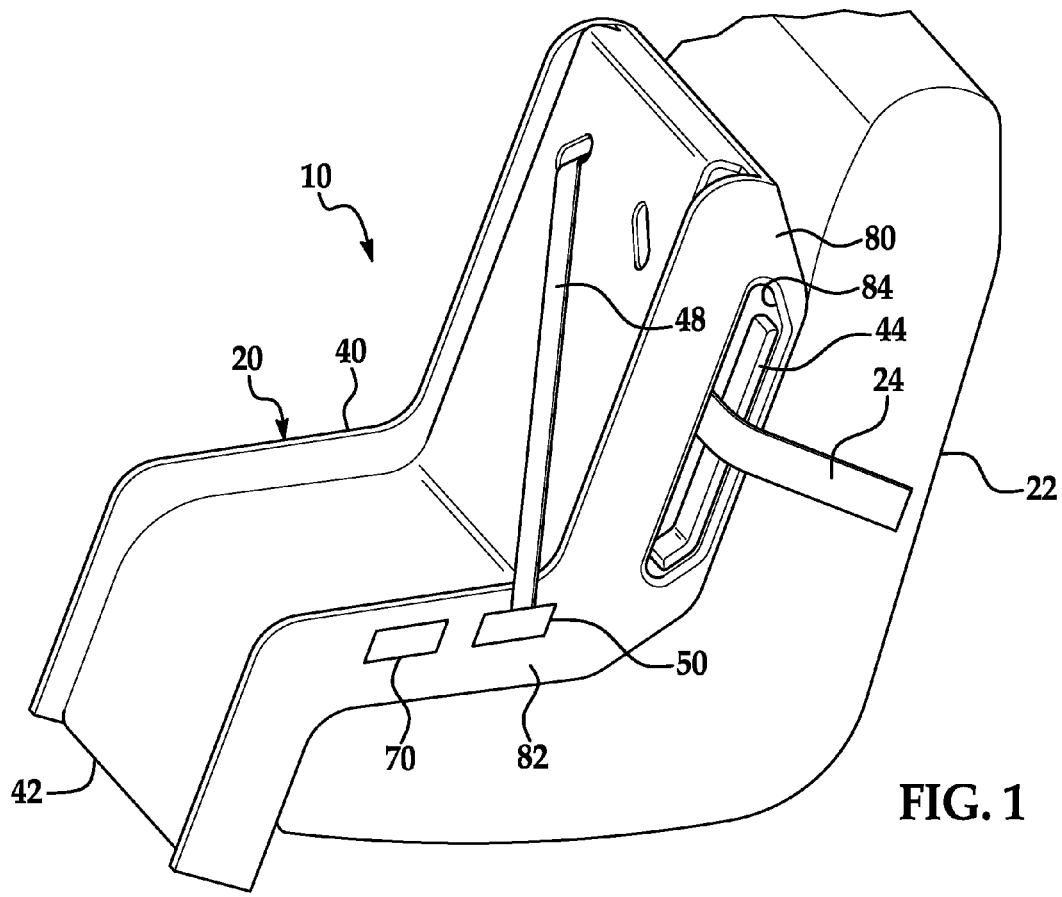
FIG. 1 is a schematic of a child seat in accordance with an exemplary embodiment.
Figure 3:
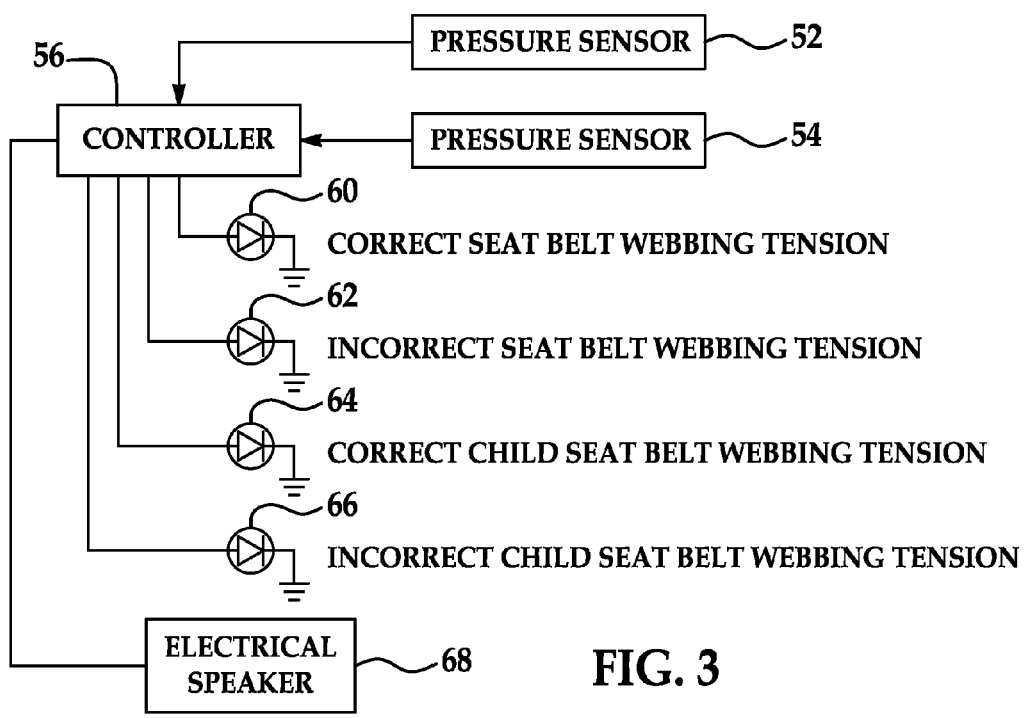
FIG. 3 is an electrical schematic associated with the child seat of FIG. 1.
Figure 2:
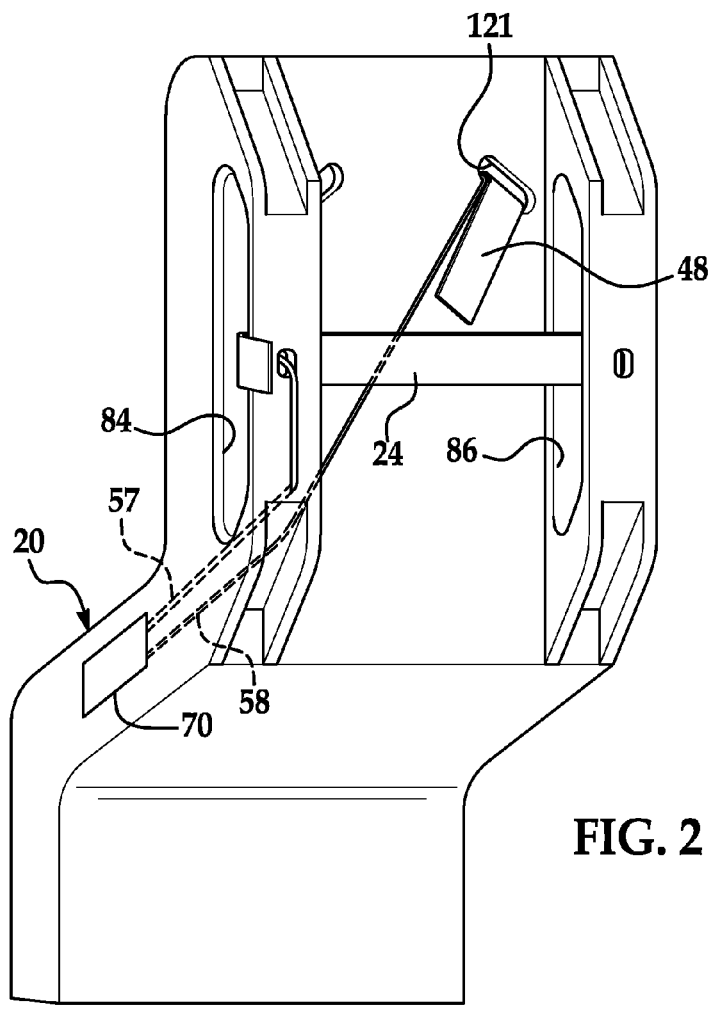
FIG. 2 is another schematic of the child seat of FIG. 1.
Figure 4:
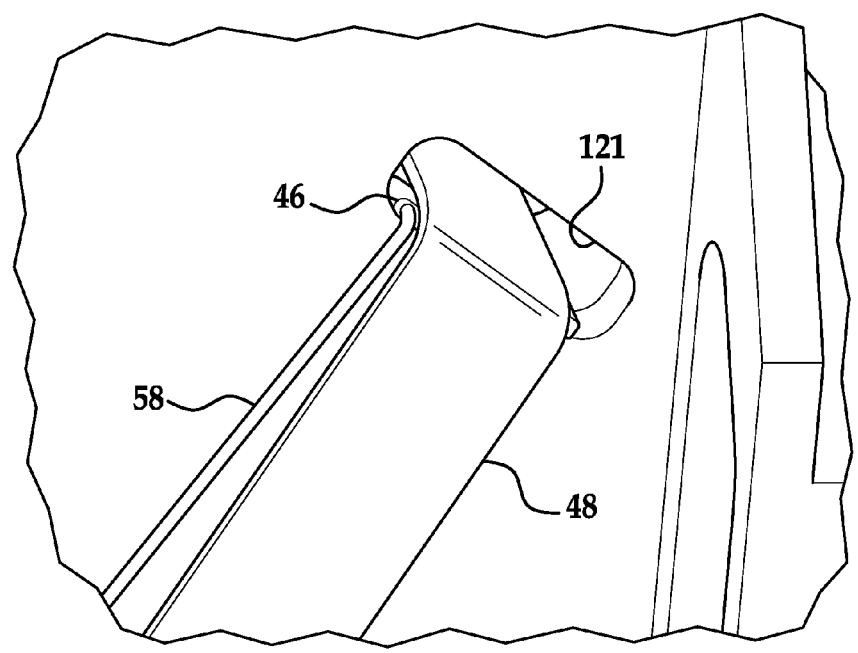
FIG. 4 is an enlarged schematic of a portion of the child seat of FIG. 1.

Referring to FIGS. 1-3, a vehicle 10 includes a child seat 20 and a vehicle seat 22. The child seat 20 is configured to be secured to the vehicle seat 22 via the seat belt webbing 24.

The child seat 20 is configured to secure a child thereon. The child seat 20 includes a child seat frame 40, a cushion 42, bladders 44, 46, child seat webbing 48, a buckle retainer 50, pressure sensors 52, 54, a controller 56, conduits 57, 58, light emitting diodes (LEDs) 60, 62, 64, 66, an electrical speaker 68, and a housing 70.

Referring to FIGS. 1 and 2, the child seat frame 40 is provided to support a child thereon. The child seat frame 40 includes a back portion 80 coupled to a seat portion 82. In one exemplary embodiment, the back portion 80 is integral with seat portion 82 and is constructed from plastic. The back portion 80 defines apertures 84, 86 for receiving the seat belt webbing 24 therethrough.

The cushion 42 is provided to cushion a child seated on the child seat 20. The cushion 42 is disposed on the back portion 80 and on the seat portion 82.

Figure 5:
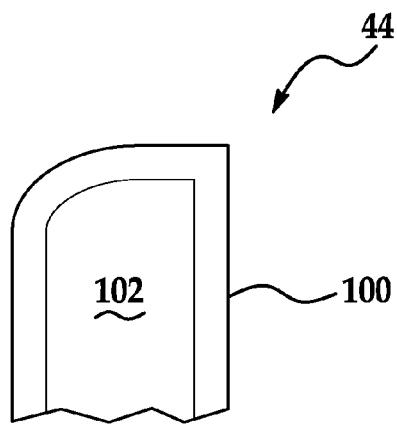
FIG. 5 is a cross-sectional schematic of a portion of a first bladder utilized in the child seat of FIG. 1.
Figure 6:
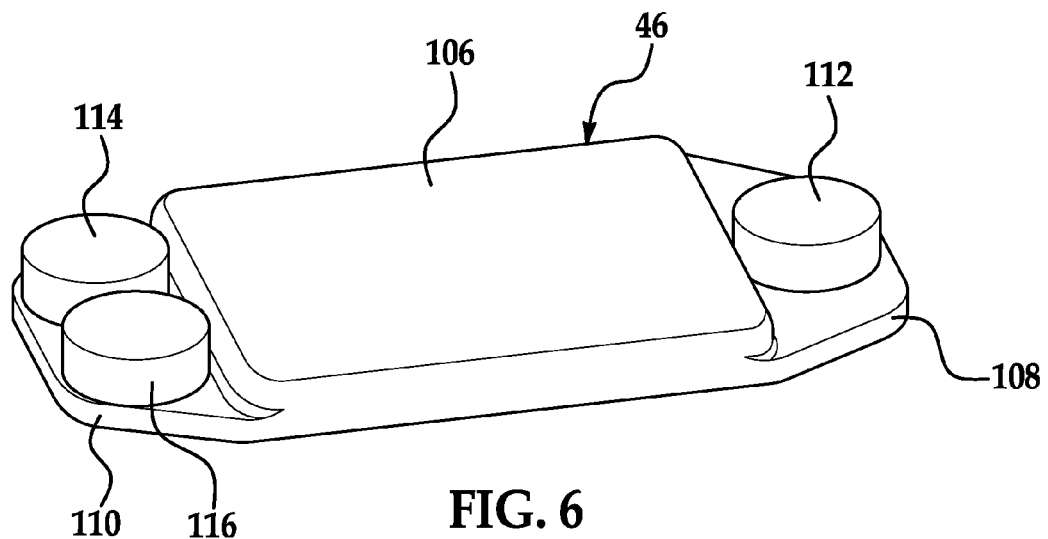
FIG. 6 is a schematic of a second bladder utilized in the child seat of FIG. 1.
Figure 7:
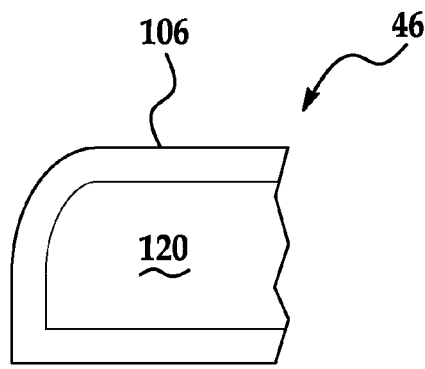
FIG. 7 is a cross-sectional schematic of a portion of the second bladder of FIG. 6.

Referring to FIGS. 1, 2 and 5, the bladder 44 is configured to hold a fluid 102 therein. In particular, the bladder 44 includes a deformable outer wall 100 defining an interior region for holding the fluid 102 therein. The bladder 44 is disposed proximate the aperture 84 of the back portion 80. A conduit 57 extends from the interior region of the bladder 44 to the pressure sensor 54 disposed in the housing 70. The bladder 44 is attached to the back portion 80 utilizing a glue or other attachment mechanisms known to those skilled in the art. When the seat belt webbing 24 is disposed adjacent the bladder 44, the pressure of the fluid 102 within the bladder 44 is indicative of an amount of tension applied to the seat belt webbing 24.

Referring to FIGS. 2, 4, 6 and 7, the bladder 46 is configured to hold a fluid 120 therein. In particular, the bladder 44 includes a deformable outer wall 106 defining an interior region for holding the fluid 120 therein, and flanges portions 108, 110 disposed at opposite ends of the outer wall 106. The bladder 46 is disposed proximate an aperture 121 of the back portion 80. A conduit 58 extends from the interior region of the bladder 46 to the pressure sensor 56 disposed in the housing 70. The bladder 46 is attached to the back portion 80 utilizing screws 112, 114, 116. In an alternative embodiment, pushpins or adhesives could be used to attach the bladder 46 to the back portion 80. The screw 112 extends through an aperture in the flange 108 for attaching the bladder 46 to the back portion 80. The screws 114, 116 extend through apertures in the flange 110 for attaching the bladder 46 to the back portion 80. When the child seat webbing 48 is disposed against the bladder 46, the pressure of the fluid 120 within the bladder 46 is indicative of an amount of tension applied to the child seat webbing 48.

The child seat webbing 48 is provided to secure a child to the child seat 20. The child seat webbing 48 is fixedly attached to the back portion 80 of the child seat frame 40 and extends through the aperture 121 of the back portion 80. From the aperture 121, the child seat webbing 48 extends over a chest of a child to the buckle retainer 50.

Referring to FIGS. 2 and 3, the pressure sensor 52 is provided to generate a signal indicative of an amount of pressure of the fluid 102 in the bladder 44, which is indicative of an amount of tension on the seat belt webbing 24. The pressure sensor 52 fluidly communicates with an interior region of the bladder 44 via the conduit 57. It should be noted that when the amount of tension of the seat belt webbing 24 is less than a first predetermined tension value, the child seat 20 has been incorrectly installed on the vehicle seat 10. In contrast, when the amount of tension of the seat belt webbing 24 is greater than or equal to the first predetermined tension value, the child seat 20 has been securely installed on the vehicle seat 10.

The pressure sensor 54 is provided to generate a signal indicative of an amount of pressure of the fluid 120 in the bladder 46, which is indicative of an amount of tension on the child seat webbing 48. The pressure sensor 54 fluidly communicates with an interior region of the bladder 46 via the conduit 58. It should be noted that when the amount of tension of the child seat webbing 48 is less than a second predetermined tension value, a child has not been correctly secured on the child seat 20. In contrast, when the amount of tension of the child seat webbing 48 is greater than or equal to the second predetermined tension value, the child has been correctly secured on the child seat 20.

The controller 56 is provided to generate control signals to induce devices to notify an operator as to whether the child seat 20 been correctly secured to the vehicle seat 22 and whether a child has been correctly secured in the child seat 20. The controller 56 is electrically coupled to the pressure sensors 52, 54, LEDs 60, 62, 64, 66 and the electrical speaker 68. In particular, the controller 56 is configured to determine first and second tension values associated with the seat belt webbing 24 and the child seat webbing 48, respectively, based on the signals from the pressure sensors 52, 54, respectively. Further, the controller 56 is configured to generate a signal to induce the LED 62 to emit light having a first color or the electrical speaker 68 to emit a first sound, when the first tension value is less than the first threshold tension value. The LED 62 emitting light having the first color or the electrical speaker 68 emitting the first sound indicates that the child seat 20 has been incorrectly secured to the vehicle seat 22. Further, the controller 56 is configured to generate a signal to induce the LED 60 to emit light having a second color or the electrical speaker 68 to emit a second sound, when the first tension value is greater than or equal to the first threshold tension value. The LED 60 emitting light having the second color or the electrical speaker 68 emitting the second sound indicates that the child seat 20 has been correctly secured to the vehicle seat 22. Further, the controller 56 is configured to generate a signal to induce the LED 66 to emit light having a first color or the electrical speaker 68 to emit a third sound, when the second tension value is less than the second threshold tension value. The LED 66 emitting light having the first color or the electrical speaker 68 emitting the third sound indicates that the child has been incorrectly secured in the child seat 20. Further, the controller 56 is configured to generate a signal to induce the LED 64 to emit light having a second color or the electrical speaker 68 to emit a fourth sound, when the second tension value is greater than or equal to the second threshold tension value. The LED 64 emitting light having the second color or the electrical speaker 68 emitting the fourth sound indicates that the child has been correctly secured in the child seat 20.

Figure 8:
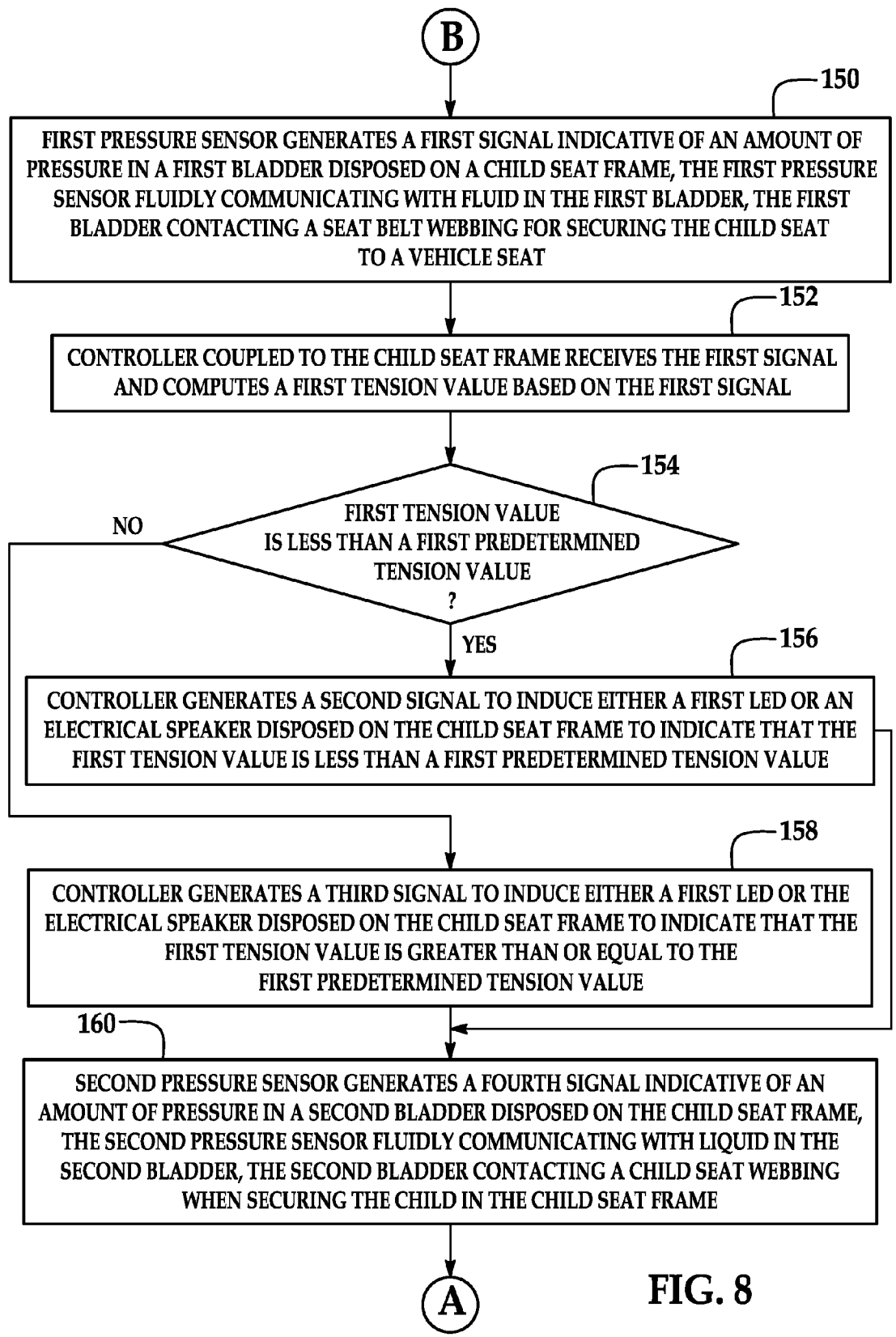
FIGS. 8-9 are flowcharts of a method for monitoring installation of the child seat of FIG. 1 in accordance with another exemplary embodiment.
Figure 9:
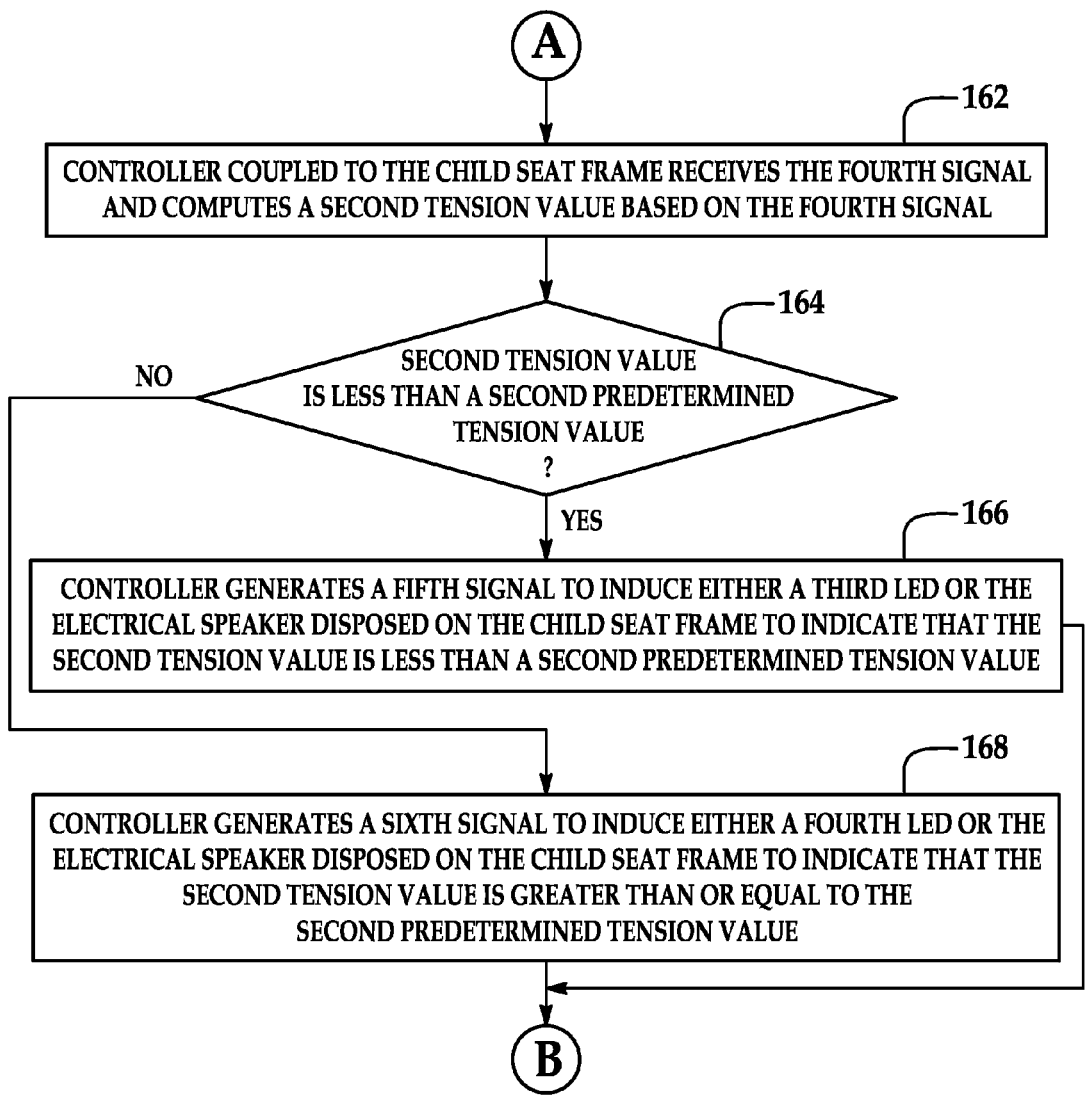

Referring to FIGS. 8 and 9, a flowchart of a method for monitoring installation of the child seat 20 on the vehicle seat 22, and for monitoring securement of a child in the child seat 20 will now be explained.

At step 150, the pressure sensor 52 generates a first signal indicative of an amount of pressure in the bladder 44 disposed on the child seat frame 40. The pressure sensor 52 fluidly communicates with the fluid 102 in the bladder 44. The bladder 44 contacts the seat belt webbing 24 for securing the child seat 20 to the vehicle seat 22.

At step 152, the controller 56 coupled to the child seat frame 40 receives the first signal and computes a first tension value based on the first signal.

At step 154, the controller 56 makes a determination as to whether the first tension value is less than a first predetermined tension value. If the value of step 154 equals "yes", the method advances to step 156. Otherwise, the method advances to step 158.

At step 156, the controller 56 generates a second signal to induce either the LED 62 or the electrical speaker 68 disposed on the child seat frame 40 to indicate that the first tension value is less than a first predetermined tension value. After step 156, the method advances to step 160.

At step 158, the controller 56 generates a third signal to induce either the first LED or the electrical speaker disposed on the child seat frame 40 to indicate that the first tension value is greater than or equal to the first predetermined tension value. After step 158, the method advances to step 160.

At step 160, the pressure sensor 54 generates a fourth signal indicative of an amount of pressure in the bladder 46 disposed on the child seat frame 40. The pressure sensor 54 fluidly communicates with the fluid 120 in the bladder 46. The bladder 46 contacts the child seat webbing 48 when securing the child in the child seat frame 40.

At step 162, the controller 56 coupled to the child seat frame 40 receives the fourth signal and computes a second tension value based on the fourth signal.

At step 164, the controller 56 makes a determination as to whether the second tension value is less than a second predetermined tension value. If the value of step 164 equals "yes", the method advances to step 166. Otherwise, the method advances to step 168.

At step 166, the controller 56 generates a fifth signal to induce either the LED 66 or the electrical speaker 68 disposed on the child seat frame 40 to indicate that the second tension value is less than the second predetermined tension value. After step 166, the method returns the step 150.

At step 168, the controller 56 generates a sixth signal to induce either the LED 64 or the electrical speaker 68 disposed on the child seat frame 40 to indicate that the second tension value is greater than or equal to the second predetermined tension value. After step 168, the method returns to step 150.

In an alternative embodiment, a vehicle seat having a vehicle seat frame configured to receive an adult occupant could be utilized with the bladder 46 disposed thereon. The vehicle seat includes a seat belt webbing coupled to the vehicle seat frame. The bladder 46 would be configured to contact the seat belt webbing. The bladder 46 has a fluid therein. The vehicle seat includes a pressure sensor fluidly communicating with the fluid in the bladder 46. The pressure sensor is configured to output a first signal indicative of an amount of pressure in the bladder 46. The vehicle seat further includes a controller coupled to the vehicle seat frame. The controller is configured to receive the first signal and to compute a first tension value based on the first signal. The controller is further configured to generate a second signal to induce a first device disposed on the vehicle seat frame to indicate when the first tension value is less than a first predetermined tension value.

The child seat and the method for monitoring installation of the child seat provide a substantial advantage over other child seats and methods. In particular, the child seat and the method utilize a pressure signal indicating a pressure of a bladder coupled to the child seat to determine whether the child seat has been correctly secured to the vehicle seat.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another. Further, the use of the terms a, an, etc. do not denote a limitation of quantity, but rather denote the presence of at least one of the referenced item.

What is claimed is:

1. A child seat, comprising:
    a child seat frame configured to receive a child occupant, the child seat frame configured to receive a seat belt webbing for securing the child seat frame to a vehicle seat;
    a first bladder configured to contact the seat belt webbing, the first bladder having a fluid therein;
    a first pressure sensor fluidly communicating with the fluid in the first bladder, the first pressure sensor configured to output a first signal indicative of an amount of pressure in the first bladder, and
    a controller coupled to the child seat frame configured to receive the first signal and to compute a first tension value based on the first signal, the controller further configured to generate a second signal to induce a first device disposed on the child seat frame to indicate when the first tension value is less than a first predetermined tension value.

2. The child seat of claim 1, wherein the first device comprises a light-emitting diode, the light-emitting diode emitting light having a first color in response to the second signal.

3. The child seat of claim 1, wherein the first device comprises an electrical speaker, the electrical speaker emitting a first audible sound in response to the second signal.

4. The child seat of claim 1, wherein the controller is further configured to generate a third signal to induce a second device to indicate when the first tension value is greater than or equal to the first predetermined tension value.

5. The child seat of claim 4, wherein the second device comprises a light-emitting diode, the light-emitting diode emitting light having a first color in response to the third signal.

6. The child seat of claim 4, wherein the second device comprises an electrical speaker, the electrical speaker emitting a first audible sound in response to the third signal.

7. The child seat of claim 1, wherein the child seat frame further includes a child seat frame webbing for securing a child to the child seat frame, the child seat further comprising:
    a second bladder configured to contact the child seat frame webbing, the second bladder having a fluid therein;
    a second pressure sensor fluidly communicating with the fluid in the second bladder, the second pressure sensor configured to output a third signal indicative of an amount of pressure in the second bladder, and
    the controller further configured to receive the third signal and to compute a second tension value based on the third signal, the controller further configured to generate a fourth signal to induce a second device disposed on the child seat frame to indicate when the second tension value is less than a second predetermined tension value.

8. The child seat of claim 7, wherein the controller is further configured to generate a fifth signal to induce a third device to indicate when the first tension value is greater than or equal to the second predetermined tension value.

9. The child seat of claim 1, wherein the fluid comprises at least one of a polyurethane fluid and a silicon fluid.

10. A method for monitoring installation of a child seat on a vehicle seat, the child seat having a child seat frame configured to receive a child occupant, the child seat frame configured to receive a seat belt webbing for securing the child seat frame to a vehicle seat, the child seat further having a first bladder, a first pressure sensor, and a controller, the first bladder having a fluid therein and contacting the seat belt webbing, the first pressure sensor fluidly communicating with the fluid in the first bladder, the controller operably coupled to the first pressure sensor, the method comprising:
    generating a first signal indicative of an amount of pressure in the first bladder contacting the seat belt webbing, utilizing the first pressure sensor;
    determining a first tension value based on the first signal, utilizing the controller; and
    generating a second signal to induce a first device disposed on the child seat frame to indicate when the first tension value is less than a first predetermined tension value, utilizing the controller.

11. The method of claim 10, wherein the first device comprises a light-emitting diode, and indicating when the first tension value is less than the first predetermined tension value comprises emitting light having a first color from the light-emitting diode.

12. The method of claim 10, wherein the first device comprises an electrical speaker, and indicating when the first tension value is less than the first predetermined tension value comprises emitting a first audible sound from the electrical speaker.

13. The method of claim 10, further comprising generating a third signal to induce a second device to indicate when the first tension value is greater than or equal to the first predetermined tension value, utilizing the controller.

14. The method of claim 13, wherein the second device comprises a light-emitting diode, the method further comprising emitting light having a first color from the light-emitting diode in response to the third signal.

15. The method of claim 13, wherein the second device comprises an electrical speaker, the method further comprising emitting a first audible sound from the electrical speaker in response to the third signal.

16. The method of claim 10, wherein the child seat frame further includes a child seat frame webbing for securing a child to the child seat frame, the child seat further comprises a second bladder and a second pressure sensor, the second bladder configured to contact the child seat frame webbing, the second bladder having a fluid therein, the second pressure sensor fluidly communicating with the fluid in the second bladder, the method comprising:

generating a third signal indicative of an amount of pressure in the second bladder contacting the child seat frame webbing, utilizing the second pressure sensor;

determining a second tension value based on the third signal, utilizing the controller; and generating a fourth signal to induce a second device disposed on the child seat frame to indicate when the second tension value is less than a second predetermined tension value, utilizing the controller.

17. The method of claim 16, further comprising generating a fifth signal to induce a third device to indicate when the first tension value is greater than or equal to the second predetermined tension value.

18. A vehicle seat, comprising:

a vehicle seat frame configured to receive an occupant;

a seat belt webbing coupled to the vehicle seat frame and configured to secure the occupant to the vehicle seat frame;

a first bladder configured to contact the seat belt webbing, the first bladder having a fluid therein;

a first pressure sensor fluidly communicating with the fluid in the first bladder, the first pressure sensor configured to output a first signal indicative of an amount of pressure in the first bladder, and a controller coupled to the vehicle seat frame, the controller configured to receive the first signal and to compute a first tension value based on the first signal, the controller further configured to generate a second signal to induce a first device disposed on the vehicle seat frame to indicate when the first tension value is less than a first predetermined tension value.

* * * * *